(12) United States Patent
Kadatch

(10) Patent No.: US 9,558,198 B2
(45) Date of Patent: Jan. 31, 2017

(54) FILE MAP COMPRESSION USING RUN LENGTH ENCODING FOR ACTIVE BLOCKS

(71) Applicant: Google Inc., Mountain View, CA (US)

(72) Inventor: Andrew Kadatch, Redmond, WA (US)

(73) Assignee: Google Inc., Mountain View, CA (US)

( * ) Notice: Subject to any disclaimer, the term of this patent is extended or adjusted under 35 U.S.C. 154(b) by 483 days.

(21) Appl. No.: 13/826,634

(22) Filed: Mar. 14, 2013

(65) Prior Publication Data
US 2013/0262411 A1    Oct. 3, 2013

Related U.S. Application Data

(60) Provisional application No. 61/616,745, filed on Mar. 28, 2012.

(51) Int. Cl.
G06F 17/30 (2006.01)
G06F 3/06 (2006.01)

(52) U.S. Cl.
CPC ......... *G06F 17/30153* (2013.01); *G06F 3/067* (2013.01); *G06F 3/0608* (2013.01); *G06F 3/0643* (2013.01)

(58) Field of Classification Search
CPC .. G06F 17/30153; G06F 3/067; G06F 3/0643; G06F 3/0608
USPC .......................................................... 707/693
See application file for complete search history.

(56) References Cited

U.S. PATENT DOCUMENTS

| | | | |
|---|---|---|---|
| 5,774,715 A * | 6/1998 | Madany et al. | |
| 6,055,526 A * | 4/2000 | Ambroziak | G06F 17/30622 707/693 |
| 6,119,120 A | 9/2000 | Miller | |
| 6,430,565 B1 | 8/2002 | Berger | |
| 7,676,628 B1 * | 3/2010 | Compton | G06F 3/0605 711/114 |

(Continued)

FOREIGN PATENT DOCUMENTS

| | | |
|---|---|---|
| CN | 102063377 A | 5/2011 |
| WO | WO98/09380 | 3/1998 |

OTHER PUBLICATIONS

Al Mamun, Md Abdullah, et al. "A New Compression Based Index Structure for Efficient Information Retrieval." International Journal of Science and Technology 2.1 (2012), 5 pages.*

(Continued)

*Primary Examiner* — Tony Mahmoudi
*Assistant Examiner* — Michael Le
(74) *Attorney, Agent, or Firm* — Fish & Richardson P.C.

(57) ABSTRACT

Methods, systems, and apparatus, including computer programs encoded on a computer storage medium, for compressing file maps. In one aspect, a method includes accessing a file maintained by a file system that manages access to a block device. The file includes a plurality of active blocks associated with a respective logical block number and a respective block index. The method also includes assigning a file index to the file, analyzing the file to determine a maximum block index and a minimum block index, and identifying runs of blocks in the plurality of active blocks. Each run of blocks includes a respective start block. For each of the runs of blocks, the method includes identifying a respective length. For each start block, the method includes generating a file map entry for each start block. The method also includes storing the file map entries in a file map.

30 Claims, 5 Drawing Sheets

(56) References Cited

U.S. PATENT DOCUMENTS

| | | | | |
|---|---|---|---|---|
| 2001/0043804 | A1* | 11/2001 | Nakatani | G11B 20/10527 386/241 |
| 2003/0118243 | A1* | 6/2003 | Sezer | G06T 9/005 382/245 |
| 2006/0015535 | A1* | 1/2006 | Buchsbaum | G06F 17/30076 |
| 2007/0294502 | A1 | 12/2007 | Gunther | |
| 2009/0300084 | A1* | 12/2009 | Whitehouse | 707/205 |
| 2010/0131476 | A1* | 5/2010 | Kataoka | G06F 17/30979 707/693 |
| 2011/0060887 | A1* | 3/2011 | Thatcher | G06F 3/0604 711/171 |
| 2011/0119455 | A1 | 5/2011 | Tsai et al. | |
| 2011/0296133 | A1* | 12/2011 | Flynn | G06F 11/1048 711/171 |

OTHER PUBLICATIONS

González, Roi Blanco, et al. "Index Compression for Information Retrieval Systems." (2008), 161 pages.*
International Search Report and Written Opinion for PCT Application Serial No. PCT/US2013/033440, mailed Jul. 1, 2013, 13 pages.
Machine translation of Application No. CN 200910265465, dated Dec. 13, 2016, 58 pages.

* cited by examiner

FILE MAP COMPRESSION USING RUN LENGTH ENCODING FOR ACTIVE BLOCKS

CROSS REFERENCE TO RELATED APPLICATIONS

This application is a non-provisional of and claims priority to U.S. Provisional Patent Application No. 61/616,745, filed on Mar. 28, 2012, the entire contents of which are hereby incorporated by reference.

BACKGROUND

This specification relates to compressing file maps, and particularly to compressing file maps for virtual machines.

Cloud computing is network-based computing in which typically large collections of servers housed in data centers or "server farms" provide computational resources and data storage as needed to remote end users. Some cloud computing services allow end users to run user-provided server software applications (e.g., e-commerce server applications, web servers, or file servers) in the cloud. Some other cloud computing services provide access to software applications such as word processors and other commonly used applications to end users who utilize the applications through web browsers or other client-side software. Users' electronic data files are usually stored in the server farm rather than on the users' personal computing devices.

SUMMARY

In general, one innovative aspect of the subject matter described in this specification can be embodied in methods that include the actions of accessing a file maintained by a file system that manages access to a block device. The file includes a plurality of active blocks. Each of the plurality of active blocks is associated with a respective logical block number and a respective block index that represents a position of the block relative to other blocks in the output file. The method also includes assigning a file index to the file and analyzing the file to determine a maximum block index and a minimum block index included in the file. The method also includes identifying runs of blocks in the plurality of active blocks. Each run of blocks includes a respective start block. Some runs of blocks include multiple blocks that are adjacent to one another in the output file. The logical block numbers associated with the adjacent blocks increase by one. For each of the runs of blocks, the method includes identifying a respective length of the run of blocks. For each start block, the method includes generating a file map entry for each start block. Generating the file map entry includes the actions of: compressing the file index; compressing the block index associated with the start block based on the maximum block index and minimum block index; and compressing the length of the run of blocks associated with the start block. The method also includes storing the file map entries in a file map. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method can include storing the file map entries in order based on the logical block numbers associated with the file map entries. The at least one of the file map entries is a triplet having the format <compressed file index, compressed block index, compressed length of the run of blocks>. Compressing the file index and block index can include using variable length compression to compress the file index and the block index. Compressing the length of the run of blocks can include using arithmetic encoding, Huffman coding or universal coding. The file map can include file map entries associated with at least a second file maintained by the file system and compressing the file index can include compressing the file index based on a number of files referenced by the file map. The second file can be assigned a second file index that is different from the file index assigned to the file. The file index can uniquely identify the file and the second file index uniquely identifies the second file. The method can include loading the file map, during an initialization process associated with the block device; and for each N-th file map entry included in the file map: storing a pointer to the N-th file map entry in a data structure, wherein N is an integer greater than 1 and wherein the pointer to the N-th file map entry is stored at location based on the logical block number associated with the N-th file map entry divided by N. The method can include receiving a request to access a particular block, wherein the particular block is associated with a particular block number; and identifying the file map entry corresponding to the particular block without decoding more than N file map entries.

Particular embodiments of the subject matter described in this document can be implemented so as to realize one or more of the following advantages. In some implementations, a compressed file map can provide or contribute to improved file access rates because the file manager can store multiple file maps in memory, due to the reduced size. In addition, because multiple file maps can be stored in memory, the file maps are swapped in and out of memory less frequently, which can also improve file access rates and a system's performance. Another advantage can be that the file manager can access data without first decoding the entire file map. This can increase file access performance because the entire file map is not first decoded before accessing the data.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
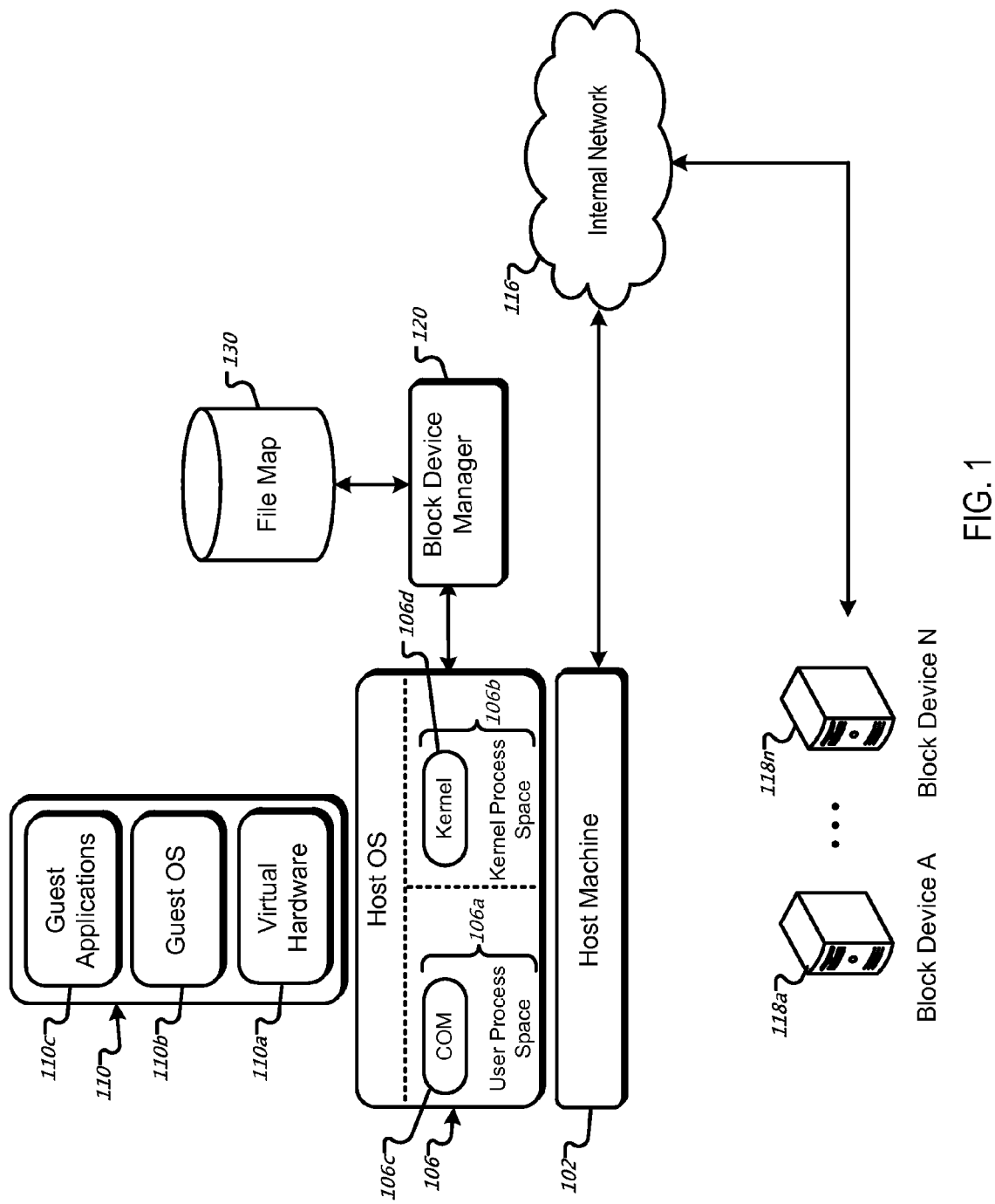
FIG. 1 shows an example of a distributed system that includes multiple virtual machine instances.

FIG. 1 is a schematic illustration of an example virtual machine system 100. The system 100 includes one or more host machines such as, for example, host machine 102. Generally speaking, a host machine is one or more data processing apparatus such as rack mounted servers or other computing devices. The data processing apparatus can be in different physical locations and can have different capabilities and computer architectures. Host machines can communicate with each other through an internal data communications network 116. The internal network 116 can include one or more wired (e.g., Ethernet) or wireless (e.g., WI-FI) networks, for example. In some implementations the internal network 116 is an intranet. Host machines can also communicate with devices on external networks, such as the Internet, through one or more gateways, which are data processing apparatus responsible for routing data communication traffic between the internal network 116 and the external network. Other types of external networks are possible.

Host machine 102 executes a host operating system 106 or other software that virtualizes the underlying host machine hardware and manages concurrent execution of one or more virtual machines (e.g., a virtual machine monitor or hypervisor). For example, the host operating system 106 is managing a virtual machine (VM) 110. Although not shown in FIG. 1, the host machine 102 can execute a second virtual machine. A VM, such as VM 110, can include a simulated version of the underlying host machine hardware, or a different computer architecture. The simulated version of the hardware is referred to as virtual hardware (e.g., virtual hardware 110a). Software that is executed by the virtual hardware is referred to as guest software. In some implementations, guest software cannot determine if it is being executed by virtual hardware or by a physical host machine. If guest software executing in a VM, or the VM itself, malfunctions or aborts, other VMs executing on the host machine will not be affected. A host machine's microprocessor(s) can include processor-level mechanisms to enable virtual hardware to execute software applications efficiently by allowing guest software instructions to be executed directly on the host machine's microprocessor without requiring code-rewriting, recompilation, or instruction emulation.

A VM's guest software can include a guest operating system (e.g., guest operating system 110b) which is software that controls the execution of respective guest software applications (e.g., guest applications 110c), within the VM and provides services to those applications. For example, a guest operating system could be a variation of the UNIX operating system. Other operating systems are possible. Each VM can execute the same guest operating system or different guest operating systems. In further implementations, a VM does not require a guest operating system in order to execute guest software applications. A guest operating system's access to resources such as networks and virtual disk storage is controlled by the underlying host operating system.

A VM can be allocated a network address through which its guest software can communicate with other processes reachable through the internal network 116 or the Internet. For example, guest software executing on VM 110 can communicate with guest software executing on a second VM. In some implementations, each VM is allocated one or more unique Internet Protocol (IP) version 4 or version 6 addresses and one or more User Datagram Protocol (UDP) port numbers. Other address schemes are possible.

Each VM (e.g., VM 110) is allocated a set of virtual memory pages from the virtual memory of the underlying host operating system and is allocated virtual disk blocks from one or more virtual block devices for use by the guest software executing on the VM. For example, the host operating system 106 allocates virtual memory pages and virtual disk blocks to VM 110. In some implementations, a given VM cannot access the virtual memory pages assigned to other VMs. For example, VM 110 cannot access memory pages that have been assigned to a different VM. A virtual block device can be persisted across VM restarts.

Virtual block devices can be virtualized storage devices, e.g., virtualized hard drives or virtualized RAID arrays. Each virtual block device is organized into one or more virtual blocks. Each virtual block is a predefined amount of data that is accessed as a unit. The size of a virtual block can vary depending on system constraints and requirements. One example size of a virtual block can be 4 Kilobytes. Each virtual block is associated with a respective virtual block number. Each virtual block device can be organized such that the virtual block numbers are consecutive. For example, the first virtual block of the virtual block device can be virtual block number 0, which is followed by virtual block number 1 and so on.

Each virtual block device is a collection of physical block devices 118a-118d or a collection of portions of the physical block devices 118a-118d, e.g., one or more physical blocks of a physical block device 118a-118d. The physical block devices 118a-118n are coupled to host machines or are available over the internal network 116, for example. The physical block devices 118a-118n can be any type of storage device. For example, the physical block devices 118a-118n can be hard drives, network accessible storage devices, RAID arrays, etc. Similar to the virtual block devices, each physical block device 118a-118n can be organized into one or more physical blocks. Each physical block can be a predefined amount of data that is accessed as a unit. The size of a physical block can vary depending on system constraints and requirements. One example size of a physical block can be 4 Kilobytes. In some implementations, the size of a physical block is equal to the size of the virtual block. Each physical block is associated with a physical block number (e.g. a logical block number) that indicates a relative position of the physical block with respect to the storage device on which the physical block is located. The physical blocks on a physical block device 118 can be organized by physical block number such that the physical block numbers are consecutive and increasing. For example, the first physical block of a physical block device can be physical block number 0, the next physical block can be physical block number 1, and so on.

Access to the physical block devices 118-118n is managed by a file system. For example, the file system can manage requests to read data from the physical block devices 118a-118n and can manage requests to write data to the physical block devices 118a-118n. The file system can be any type of file system that can manage the physical block devices 118a-118n. For example, the file system can be a Google File System, a distributed file system, a NTFS file system, etc.

By way of illustration, and with reference to the virtual machine 110, when the guest application 110c or guest operating system 110b attempts to perform an input/output operation on a virtual block device, initiate network communication, or perform a privileged operation, for example, the virtual hardware 110a is interrupted so that the host operating system 106 can perform the action on behalf of the virtual machine 110. The host operating system 106 can perform these actions with a process that executes in kernel process space 106b, user process space 106a, or both. Alternatively, the host operating system 106 can perform the actions by sending a request to a process that executes on a separate data processing apparatus.

The kernel process space 106b is virtual memory reserved for the host operating system's kernel 106d which can include kernel extensions and device drivers, for instance. The kernel process space has elevated privileges (sometimes referred to as "supervisor mode"); that is, the kernel 106d can perform certain privileged operations that are off limits to processes running in the user process space 106a. Examples of privileged operations include access to different address spaces, access to special functional processor units in the host machine such as memory management units, and so on. The user process space 106a is a separate portion of virtual memory reserved for user mode processes. User mode processes cannot perform privileged operations directly.

For example, when the guest application 110c or guest operating system 110b attempts to perform an input/output operation on a virtual block device, e.g., attempts to initiate a write to or a read from the virtual block device, the virtual hardware 110a is interrupted so that the host operating system 106 can perform the action on behalf of the virtual machine 110 using a block device manager 120. The block device manager 120 can be executed by the host machine 102 as part of the kernel process space 106b or the user process space 106a. Alternatively, the block device manager 120 can execute on a separate computing device. The block device manager 120 can be part of or in communication with the file system that manages the physical block devices 118a-118n.

The block device manager 120 receives requests from the virtual machine 110 to communicate with the virtual block devices allocated to the virtual machine 110. For example, the requests can include requests to read from or write to one or more virtual blocks of data allocated to the virtual machine 110. The block device manager 120 can have access to a file map 130 that can include data (e.g. file map entries) that map the virtual blocks of data to locations in files maintained by the file system. The locations in files can be used by the file system to read the physical block of data that corresponds to the virtual block of data from one of the physical block devices 118a-118n.

Figure 2:
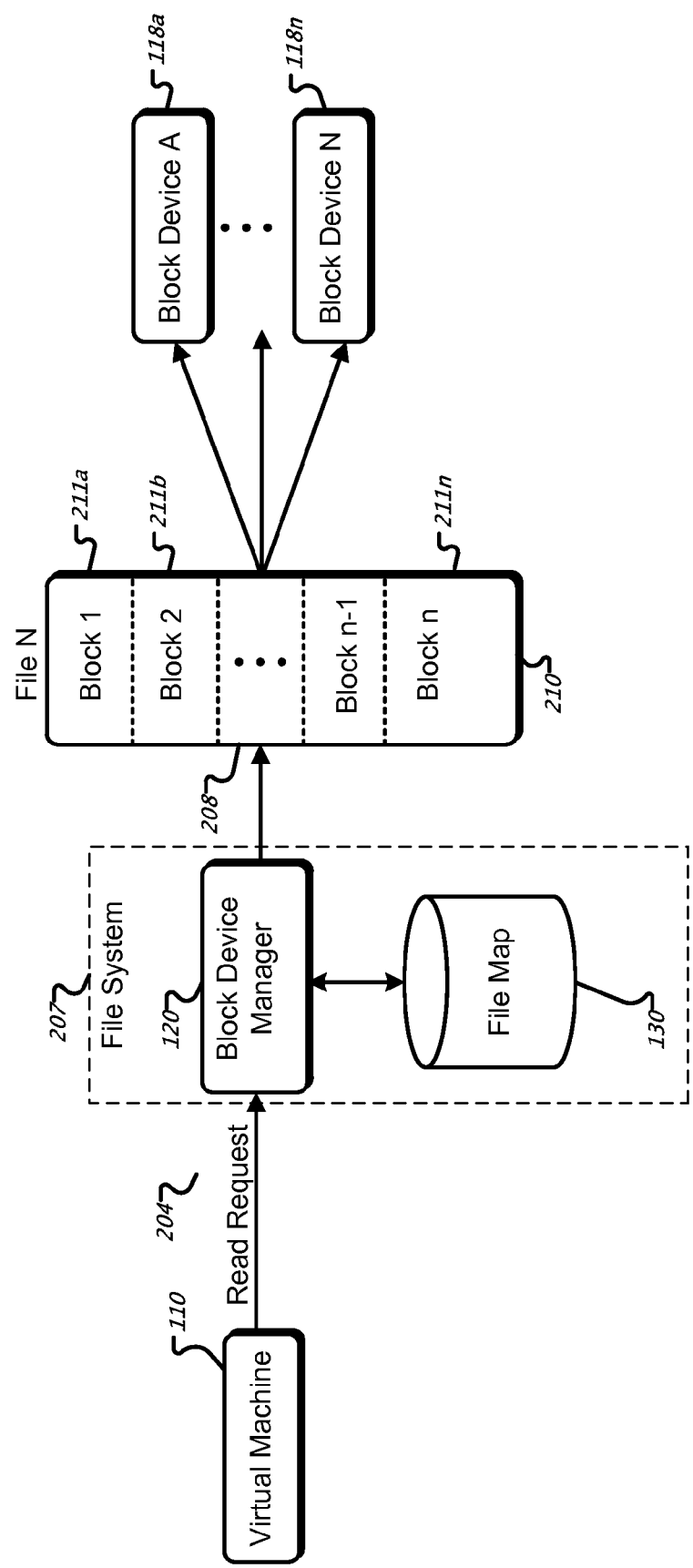
FIG. 2 illustrates an example request to communicate with a virtual block device.

FIG. 2 illustrates the processing of an example request to read a virtual block of data. In the example request of FIG. 2, a virtual machine 110 provides a request 204 to a block device manager 120 to read data from a particular virtual block. For example, the request can identify the particular virtual block by a unique virtual block number assigned to the particular virtual block.

The block device manager 120, which is included in or can communicate with a file system 207 that manages access to the physical block devices 118a-118n, can receive the read request 204 and access a file map 130 to identify a file map entry corresponding to the requested virtual block. The file map 130 can include a file map entry for each virtual block allocated to the virtual machine 302. The file map entries can be organized based on virtual block numbers such that the virtual block numbers are consecutive and increasing. For example, the first file map entry included in the file map 130 can be associated with virtual block number 0, the second file map entry included in the file map 130 can be associated with virtual block number 1, etc.

Each file map entry can include data that indicates to the file system 207 the location of the physical block corresponding to a virtual block. For example, the file map 130 can include a file map entry that maps a virtual block to a particular data file 210 that is maintained by the file system 207 and a position in the data file 210, e.g., position 211b. The file map entry can be used by the file system 207 to identify the physical block device 118 that includes the particular physical block that corresponds to the virtual block and the location within the physical block device 118 of the particular physical block. The data file 210 can be one of a group of data files that are maintained by the file system 207 and that are used by the file system 207 to identify the physical block devices that include the physical blocks of data corresponding to the virtual blocks of data. In some implementations, each physical block device 118 is associated with a single data file 210. In some implementations each physical block device can be associated with multiple data files 210.

In the example of FIG. 2, the file system 207 can receive a request to read a block of data corresponding to a virtual block number. Based on the request, the block device manager 120 can access the file map 130 to identify a file map entry that corresponds to the requested virtual block number. The file map entry can identify one or more physical block devices 118a-118n that stores the physical block of data that corresponds to the requested virtual block and the location within each physical block device, e.g., the physical block number, that corresponds to the requested virtual block.

Figure 3:
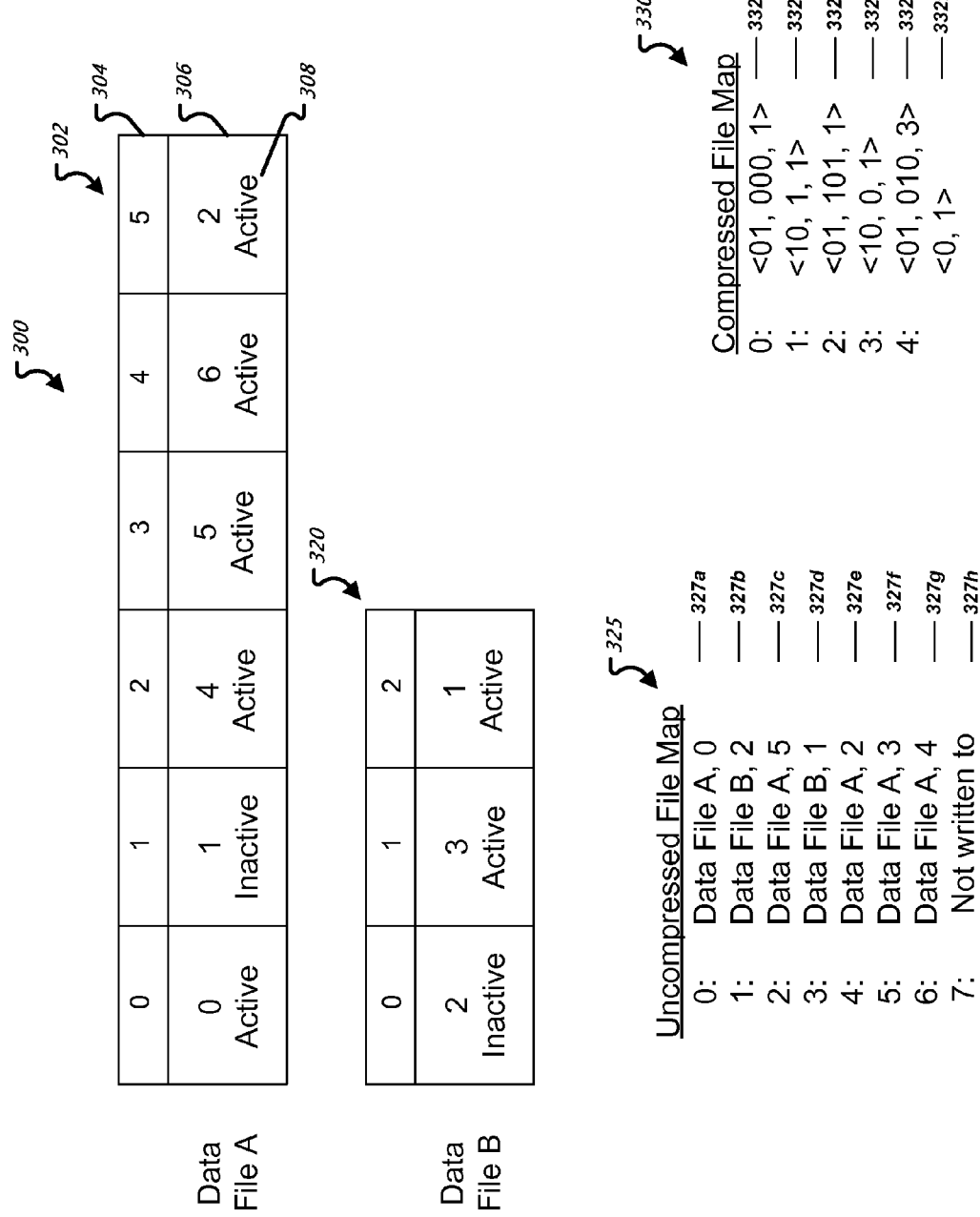
FIG. 3 illustrates example data files and file maps.

FIG. 3 shows an illustrative example 300 that includes example data files and a compressed file map. The data files 302 and 320 each include an identifier (e.g., "Data File A" and "Data File B"). Each identifier can be any number of bytes long and can be unique alpha-numeric strings. In general, the identifiers are strings of alpha-numeric characters and require multiple bytes to store the identifiers. For example, an example identifier is "/storage_locations/cluster_location/project/disk/segment003/34024392039409 23_23345398 9333_10099975423.log," which would require multiple bytes. Each data file 302 and 320 are associated with a respective physical block device. In some implementations, the data files 302 and 320 are associated with the same physical block device but represent different non-overlapping portions of the same physical block device, e.g., segments.

Each data file 302 and 320 includes one or more entries 302. Each data file 302 and 320 can be arranged similar to an array and include one or more entries. Each data file entry includes a block index 304 and a block number 306. The block index 304 identifies the location of the entry within the data file. For example, the block index 304 can be similar to an index into an array. The block number 306 identifies a physical block number associated with a physical block device that stores the data associated with a virtual block number.

Each block number 306 is also associated with a status indicator 306 that indicates whether the block number 306 is active or inactive. If a block number 306 is associated with an active status indicator 308, then the block number 306 is associated with the current version of the data and reflects the current data values, and if a block number 306 is associated with an inactive status indicator 308, then that block number is associated with an older version of the data and does not reflect the current data values. In some implementations, the status indicator 308 is metadata that is associated with the block number 306. For example, the status indicator 308 can be included in a data header associated with the block number 306.

The data files 302 and 320 can be represented by an example uncompressed file map 325 or an example compressed file map 330. The uncompressed file map 325 includes file map entries 327. Each file map entry 327*a-g* corresponds to a virtual block number and includes the data file identifier and the block index. File map entry 327*h* corresponds to a virtual block that was allocated to the virtual machine but does not include data, e.g., blocks to which data was not written. In some implementations, the uncompressed file map 325 can be partially compressed. For example, the file map entries 327*e*-327*g* can be run length compressed.

The compressed file map 330 includes file map entries 332*a*-332*f*. Each file map entry 332*a-e* corresponds to a virtual block. For example, file map entry 332*a* corresponds to a virtual block number 0, and a file map entry 332*b* corresponds to virtual block number 1.

Each file map entry 332 can include a compressed file index, a compressed block index and a compressed run length. The file map entry can be organized in a data structure, such as, for example, a triplet. The triplet can have the form <compressed file index, compressed block index, compressed run length>. Other data structures can be used.

The compressed file index can be an index that uniquely identifies the data file corresponding to the requested virtual block. The file index can be based on the number of data file identifiers and can be compressed using a variable length encoding algorithm, such as, for example, a uniform encoding algorithm. For example, the uniform encoding algorithm can compress the file index and represent the file index using a code that is ceil(log$_2$(number of data files+1)) bits long. As shown in FIG. 3, the codes representing the file indices are equal to 01 and 10, which correspond to Data File A and Data File B, respectively. In some implementations, the file index is compressed using compression techniques other than a variable length encoding algorithm. In addition, adaptive or static compression techniques can be used. A table can be stored that includes the codes and the corresponding data file identifier. The table can be used by the block device manager to translate the codes.

The compressed block index can identify the location within the data file that corresponds to a particular virtual block. For example, the data file can be arranged similar to an array, and the block index can be used as an index to access a particular location/entry in the data file. Similar to the file index, the block index can be compressed using a variable length encoding algorithm, e.g., uniform encoding. The variable length encoding algorithm used to compress the block index can be the same as the variable length encoding algorithm used to encode the file index or can be different. In some implementations, the compression algorithm used to compress the file index is different from the compression algorithm used to compress the block index.

The compressed block index can represent the block index using codes that are ceil(log$_2$(Max[i]−Min[i]+1) bits long, where Max[i] represents the maximum block index associated with an active block included in the data file and Min[i] represents the minimum block index associated with an active block included in the data file. As seen in FIG. 3, the compressed block indices associated with data file 302 are represented using three bit codes 000, 101 and 010, which correspond to block indices 0, 5 and 2, respectively, and the compressed block indices associated with Data File B are represented using 1 bit codes 0 and 1, which correspond to block indices 1 and 2, respectively. In some implementations, the block index is compressed using compression techniques other than a variable length encoding algorithm. In addition, adaptive or static compression techniques can be used. The codes and the corresponding block index values can be stored in the table that stores the codes and corresponding data file identifiers.

The compressed run length can represent a number of active blocks stored in order based on the physical block number ("a run of blocks"). Referring to data file 302, physical block 4, physical block 5 and physical block 6 are active blocks and stored adjacent to one another in the data file 302. As a result, the run length associated with the run of blocks starting at physical block 4 is equal to three. Each run of blocks includes a start block, i.e., the first block of the run. In the above example, the start block is physical block 4. In some instances, a run of blocks can have a run length equal to one block. For example, the run of blocks starting at physical block 0 is equal to 1, and the start block is equal to physical block 0.

The run length can also be compressed using various compression techniques. For example, the run length can be compressed using variable length encoding algorithms, e.g., for example, arithmetic encoding, Huffman encoding, or universal codes (e.g., unary code, Golomb code, Rice code, etc.). Although FIG. 3 illustrates the compressed run length as a number, each file map entry can include a code associated with the encoding algorithm to represent the compressed run length. For example, if the run length is compressed using Huffman encoding, then the compressed run length is represented by a Huffman code. The encoding algorithms can be adaptive or static. The block index and the run length can be used for run length compression. The codes used to represent the run length and the values corresponding to the codes can be stored in a table.

In some implementations, the file map 330 includes a file map entry 332*f* that does not correspond to a virtual block number. Instead, the file map entry 332*f* can be used by the file system to represent blocks that are inactive or blocks that do not store data, e.g., data has not been written to the blocks.

Figure 4:
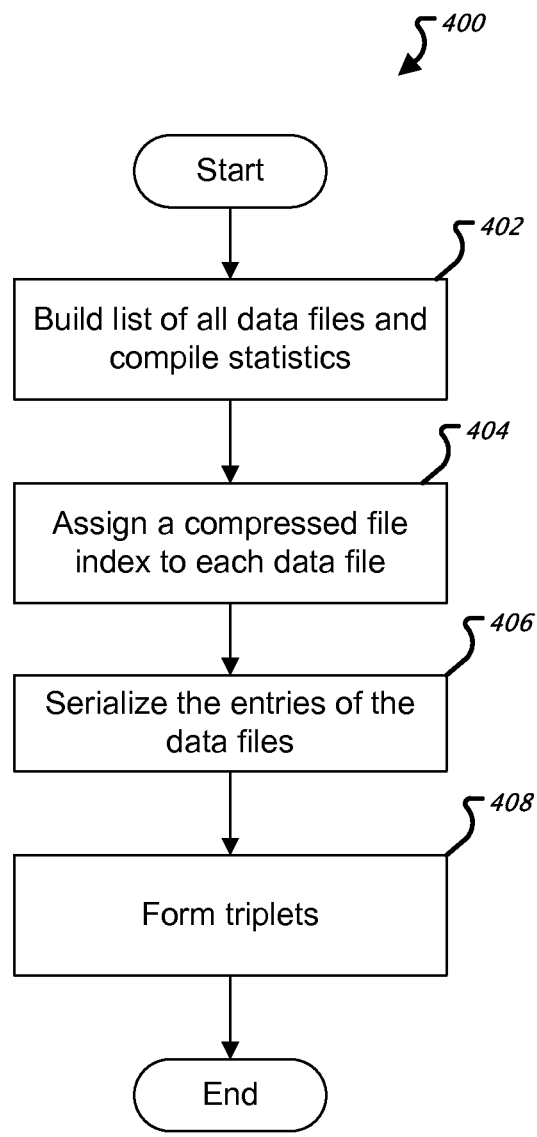
FIG. 4 is a flowchart of an example process for compressing a file map.

FIG. 4 is a flowchart of an example process 400 for compressing a file map. The process 400 begins by analyzing an uncompressed file map, building a list of the data files referenced by the file map and gather statistics used to encode the file map entries (at 402). For example, the block device manager 120 can traverse the uncompressed file map, e.g., uncompressed file map 325, and build a list of the data files to be represented in the file map, e.g., data files 302 and 320, corresponding to the physical block device 118 (or portions of the physical block device 118) that correspond to the virtual block device allocated to a particular VM (e.g., VM 110).

As described above, statistics used to encode the file map entries are gathered for each data file (at 402). For example, as the block device manager 120 builds the list of data files, the block device manager 120 can determine statistics for each data file. The statistics can include information, such as, for example, the frequency each data file is referenced in the file map, e.g., how many file map entries refer to the data file. The frequency of data file references can be adjusted based on runs of blocks. For example, referring to the uncompressed file map 325, the block device manager 120 will consider the file map entries 327*e*-327*g* as a single reference to the Data File A. In addition, the statistics can include the maximum and minimum block indices corresponding to active blocks referenced by each data file.

Referring to the example uncompressed file map 325 of FIG. 3, the block device manager 120 can analyze the uncompressed file map 325 and can determine that two data files are referenced, e.g., data file 302 and data file 320. In addition, the block device manager 120 can determine that data file 302 is referenced three times (the run of blocks 4-6 is considered as one reference) and data file 320 is referenced two times. In addition, the block device manager 120 can determine the maximum block index and minimum block index referenced by data file 302 are equal to 5 and 0, respectively, and the maximum block index and the minimum block index referenced by data file 320 are equal to 2 and 1, respectively (block index 0 of Data Location B is an inactive block).

The entries of the data files are serialized (at 406). For example, block device manager can generate a temporary file map based on the block numbers associated with the entries in the data files. Referring to the example in FIG. 2, the block device manager 120 can generate a temporary file map that serializes the entries of the data files based on the block number associated with the entries. The temporary map can be similar to:
block number 0: Data File A, block index=0, max[i]/min[i]=[5,0]
block number 1: Data File B, block index=2, max[i]/min[i]=[2,1]
block number 2: Data File A, block index=5, max[i]/min[i]=[5,0]
block number 3: Data File B, block index=1, max[i]/min[i]=[2,1]
block number 4: Data File A, block index=2, max[i]/min[i]=[5,0]
block number 5: Data File A, block index=3, max[i]/min[i]=[5,0]
block number 6: Data File A, block index=4, max[i]/min[i]=[5,0]

The triplets are extracted from the temporary file map and the compressed file map entries are generated (at 408). For example, the block device manager 120 can analyze each entry in the temporary file map and generate a triplet. The triplet can include the compressed file index (e.g., the code representing the file index), the compressed block index (e.g., the code representing the block index), and the compressed run length (e.g., the code representing the run length).

The file index can be uniform encoded to efficiently represent the data files. For example, the block device manager 120 can assign a unique code that represents the file index to each data file based on the total number of data files. The file index is uniform encoded to efficiently represent the data file identifiers. For example, the file index can be represented in ceil(log$_2$(number of data files+1))) bits. With reference to the example data files 302 and 320 of FIG. 3, the block device manager 120 can use two-bit codes, i.e., codes that are ceil(log$_2$(2+1))) bits long, to represent the data file identifiers. The block device manager 120 can assign the data file 302 a two-bit code, e.g., 01, and assign the data file 320 a different two-bit code, e.g., 10. Because the data file identifiers are typically long alpha-numeric strings, the uniform encoded file indices can be stored using less memory.

The block index can be uniform encoded to efficiently represent the block indices. For example, the block device manager 120 can use the maximum block index and minimum block index referenced by a data file to compress the block indices associated with the data file. The block indices associated with a data file can be represented using codes that are ceil(log$_2$(maximum block index−minimum block index+1)) bits long. Referring to the example data files 302 and 320, the block indices for Data File A 302 can be represented in using three bit codes, e.g., 000, 010, 100, etc., and the block indices associated for Data File B 320 can be represented using one-bit codes, e.g., 0 and 1.

The entries of the temporary file map can also be run length encoded. For example, the block device manager 120 can analyze each entry of the temporary file map and determine whether the entry is a start of a run of blocks ("a start block"). For example, the block device manager 120 can analyze the entries of the temporary file map and determine that block number 0 corresponds to a run of a single block (e.g., start block equals block zero and the run length is equal to 1) and that block number four corresponds to a run of three blocks (start block equals block four and the run length is equal to three).

Each run length can be compressed using variable encoding algorithms, such, as, for example Huffman codes, arithmetic codes and universal codes. The triplet can include the code representing the run length, e.g., the Huffman code or a universal code.

Process 400 can be performed periodically. For example, the process 400 can be performed after a predetermined amount of time has elapsed. The predetermined amount of time can be based on system requirements or processor/system capabilities. In addition, the process 400 can be performed after a predetermined number of blocks are written. For example, the process 400 can be performed after a predetermined number of write requests. In addition, the process 400 can be performed after a file is closed or saved. For example, the process 400 can be performed after a user of the VM, e.g., VM 110 closes or saves a file stored on the virtual block device.

Figure 5:
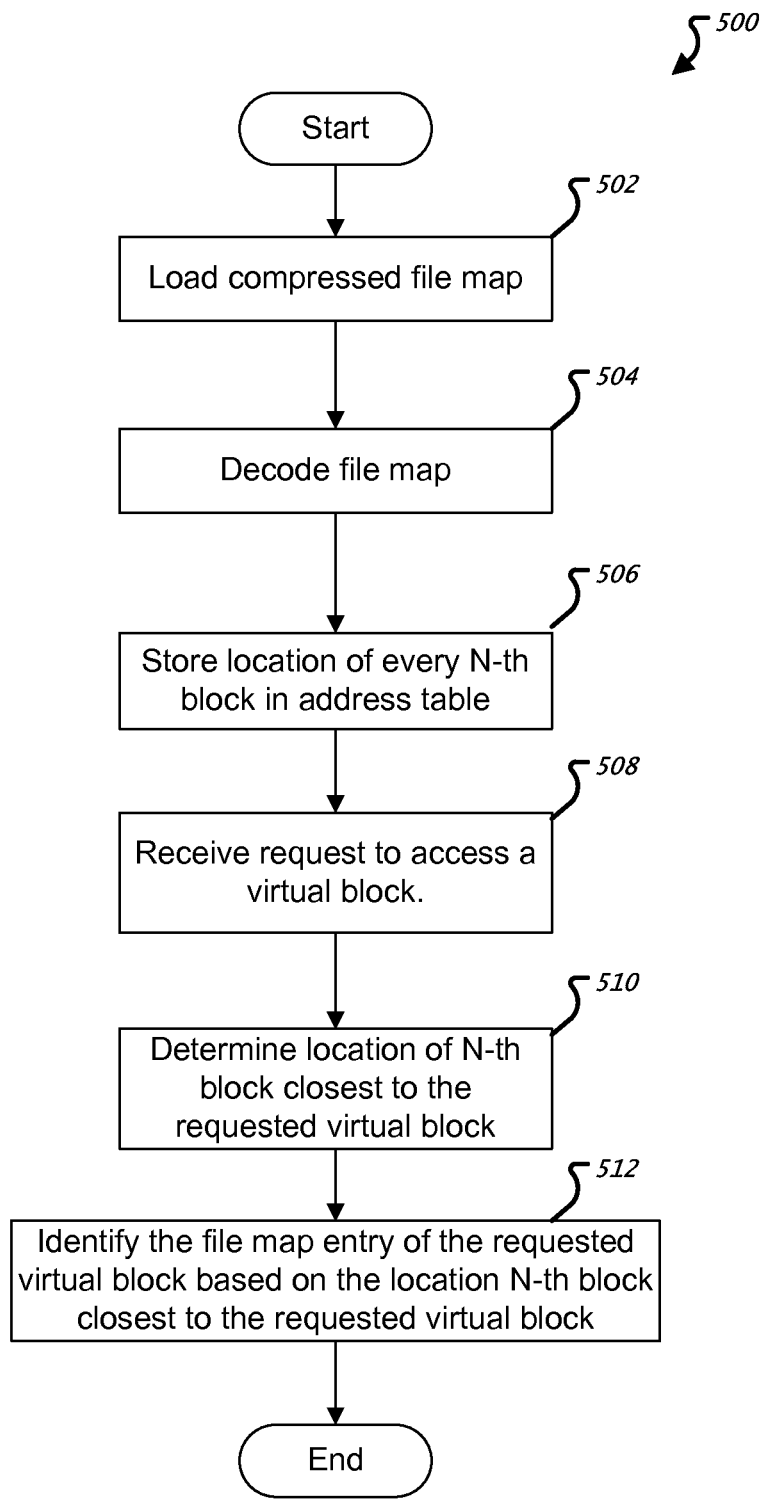
FIG. 5 is a flowchart of an example process to access a virtual block.

FIG. 5 is a flowchart of an example process 500 to access a virtual block. The process 500 begins by loading the compressed file map into memory (at 502). For example, during initialization of the virtual machine 110, the virtual block device or the physical block devices 118, the compressed file map can be loaded into memory, such as, for example Random Access Memory.

The compressed file map is decoded (at 504). For example, the block device manager 120 can decode the compressed file map based on the encoding of the compressed file map. The block device manager 120 can traverse the file map and identify the list of file indices. Referring to the example of FIG. 2, the block device manager 120 can traverse the file map 230 and determine that there are two data files because there are two different file indices (e.g., the two two-bit codes). In addition, the block device manager 120 can determine the maximum block index and minimum block index associated with each Data file.

The block index can then decode each compressed file map entry. For example, the block device manager 120 can decode the first entry from the compressed file map entry, which represents the file index. In some implementations, the block device manager 120 decodes the file index by extracting the first ceil(log$_2$(number of data files+1) bits from the compressed file map entry. Referring to the example compressed file map 230 of FIG. 3, the block device manager 120 can determine that the first two bits of the file map entry, which correspond to the code representing the file index. The block index can then decode the next entry from the compressed file map entry, which represents the compressed block index. In some implementations, the block device manager 120 can decode the block index by extracting the next ceil(log$_2$(maximum block index−minimum block index+1) bits from the compressed file map entry. Referring to the example compressed file map 230 of FIG. 3, the block device manager 120 can extract the next three bits, which correspond to the code representing block index. The block device manager 120 can access a table to interpret the codes representing the file index and the block index.

As the file map is decoded, the location of every N-th file map entry is stored in a data structure (at 506). For example, as the block device manager 120 decodes the file map entries, the block device manager 120 can store a pointer to each N-th entry in the decompressed file map. The pointers can be stored in an array. Referring to the example file map 230 of FIG. 3 and assuming N=2, the block device manager 120 can store pointers to compressed file map entries 0, 2 and 4 in an array. The pointers are stored based on the order of file map entries. For example, the first entry in the array (index 0) would store a pointer to file map entry 0 and the second entry in the array (index 1) would store a pointer to the file map entry 2. The value of N can be any number and can be chosen based on system requirements and processing/system capabilities.

Each array can be a tuple. For example, each array can store a tuple including a pointer to the file map entry and a start block. In the above example, the first entry in the array would store a pointer to file map entry 0 and the start block 0. By storing the tuple, the block device manager 120 can store the location of a file map entry that is included in a run of blocks. For example, the fourth entry in the array, corresponding to virtual block 7, which is included in the run of blocks represented in the file map entry <file index=1, block index=4, run length=3> would store a pointer to the file map entry 4 and the start block of the run, e.g., block number 4.

A second example uncompressed file map is shown below.

File Map Entries
0: <file index 1, block index 0, run length=1>
1: <file index 1, block index 3, run length=6>
2: <file index 2, block index 2, run length=3>

If N is assumed to be equal to 2, then the array could be similar to:

0: <pointer to file map entry 0, start block=0>
1: <pointer to file map entry 1, start block=1>
2: <pointer to file map entry 1, start block=1>
3: <pointer to file map entry 1, start block=1>
4: <pointer to file map entry 2, start block=2>

As seen above, the block numbers 2, 4 and 6 correspond to array indices 1, 2 and 3, which point to file map entry 1 because block numbers 2, 4 and 6 are included in the run starting at block 1.

After the array of pointers is generated (at 506), the decoded file map can be removed from memory. After the VM, the virtual block device or the physical block device has been initialized, a request to access a particular block number can be received (at 508). For example, an application executing on the VM 110 can request to access data stored in a particular virtual block, e.g., virtual block 1. The block device manager 120 can receive the read request.

The block device manager can determine the array index corresponding to the N-th file map entry closest to the requested virtual block and that is less than the requested virtual block (at 510). For example, if the requested virtual block is equal to 3, then the block device manager 120 can determine that the N-th file map entry closest to the requested virtual block and that is less than the requested virtual block is virtual block 2, which is stored in the second entry in the array, e.g., array index 1.

The file map entry corresponding to the requested virtual block can be determined based on the array of pointers (at 512). For example, the block device manager 120 can access the array corresponding to the N-th file map entry closest to the requested virtual block and use the pointer stored in the array entry to access the N-th file map entry. The block device manager 120 can then decode the remaining file map entries until the correct file map entry is decompressed. For example, the block device manager 120 can access the second array entry (index=1) and use the pointer stored in the array entry to access the file map at file map entry 2. The block device manager 120 can then decode the remaining file map entries until it reaches the file map entry for the requested block 3. This can allow the block device manager 120 to decode N or less file map entries for any access into the file map and avoid decoding the entire file map for each request to access the file map. This can also allow for random access into the file map without decoding the entire file map.

The file map entry corresponding to the requested virtual block is decoded and returned to the file system, which can then use the information to access the data stored at the physical block number corresponding to the requested virtual block number.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor can receive instructions and data from a read-only memory or a random access memory or both. The essential elements of a computer are a processor for performing actions in accordance with instructions and one or more memory devices for storing instructions and data. Generally, a computer can also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a television with one or more processors embedded therein or coupled thereto, a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
accessing a file maintained by a file system that manages access to a block device, wherein the file includes a plurality of active blocks, wherein each of the plurality of active blocks is associated with a respective logical block number and a respective block index that represents a position of the block relative to other blocks in the file;
assigning a file index to the file;
analyzing the file to determine a maximum block index and a minimum block index included in the file;
identifying runs of blocks in the plurality of active blocks, wherein each run of blocks includes a respective start block, wherein some runs of blocks include multiple blocks that are adjacent to one another in the file, wherein the logical block numbers associated with the adjacent blocks increase by one;
for each of the runs of blocks, identifying a respective length of the run of blocks;
for each start block, generating a file map entry for each start block, wherein generating the file map entry comprises:
compressing the file index;
compressing the block index associated with the start block based on the maximum block index and minimum block index; and
compressing the length of the run of blocks associated with the start block; and
storing the file map entries in a file map; and
further comprising:
loading the file map, during an initialization process associated with the block device; and
for each N-th file map entry included in the file map:
storing a pointer to the N-th file map entry in a data structure, wherein N is an integer greater than 1 and wherein the pointer to the N-th file map entry is stored at a location based on the logical block number associated with the N-th file map entry divided by N.

2. The computer-implemented method of claim 1, further comprising:
storing the file map entries in order based on the logical block numbers associated with the file map entries.

3. The computer-implemented method of claim 1, wherein at least one of the file map entries is a triplet having the format <compressed file index, compressed block index, compressed length of the run of blocks>.

4. The computer-implemented method of claim 1, wherein compressing the file index and block index comprises using variable length compression to compress the file index and the block index.

5. The computer-implemented method of claim 1, wherein compressing the length of the run of blocks comprises using arithmetic encoding, Huffman coding or universal coding.

6. The computer-implemented method of claim 1, wherein the file map includes file map entries associated with at least a second file maintained by the file system and wherein compressing the file index comprises compressing the file index based on a number of files referenced by the file map.

7. The computer-implemented method of claim 6 wherein the second file is assigned a second file index that is different from the file index assigned to the file.

8. The computer-implemented method of claim 7 wherein the file index uniquely identifies the file and the second file index uniquely identifies the second file.

9. The computer-implemented method of claim 1 further comprising;
receiving a request to access a particular block, wherein the particular block is associated with a particular logical block number;
accessing the data structure to identify a pointer corresponding to the N-th file map entry closest to the particular logical block number, wherein the logical block number corresponding to the N-th file map entry closest to the particular logical block number is less than the particular block number;
identifying the file map entry corresponding to the particular block based on the pointer corresponding to the N-th file map entry closest to the particular logical block number; and
decoding the file map entry corresponding to the particular block.

10. The computer-implemented method of claim 1 further comprising:
receiving a request to access a particular block, wherein the particular block is associated with a particular block number; and
identifying the file map entry corresponding to the particular block without decoding more than N file map entries.

11. A system comprising:
a data processing apparatus; and
a computer memory apparatus in data communication with the data processing apparatus and storing instructions executable by the data processing apparatus and that upon such execution cause the data processing apparatus to perform operations comprising:
accessing a file maintained by a file system that manages access to a block device, wherein the file includes a plurality of active blocks, wherein each of the plurality of active blocks is associated with a respective logical block number and a respective block index that represents a position of the block relative to other blocks in the file;
assigning a file index to the file;
analyzing the file to determine a maximum block index and a minimum block index included in the file;
identifying runs of blocks in the plurality of active blocks, wherein each run of blocks includes a respective start block, wherein some runs of blocks include multiple blocks that are adjacent to one another in the file, wherein the logical block numbers associated with the adjacent blocks increase by one;
for each of the runs of blocks, identifying a respective length of the run of blocks;

for each start block, generating a file map entry for each start block, wherein generating the file map entry comprises:
    compressing the file index;
    compressing the block index associated with the start block based on the maximum block index and minimum block index; and
    compressing the length of the run of blocks associated with the start block; and
storing the file map entries in a file map;
loading the file map, during an initialization process associated with the block device; and
for each N-th file map entry included in the file map:
    storing a pointer to the N-th file map entry in a data structure, wherein N is an integer greater than 1 and wherein the pointer to the N-th file map entry is stored at a location based on the logical block number associated with the N-th file map entry divided by N.

12. The system of claim 11, wherein the operations further comprise:
storing the file map entries in order based on the logical block numbers associated with the file map entries.

13. The system of claim 11, wherein at least one of the file map entries is a triplet having the format <compressed file index, compressed block index, compressed length of the run of blocks>.

14. The system of claim 11, wherein compressing the file index and block index comprises using variable length compression to compress the file index and the block index.

15. The system of claim 11, wherein compressing the length of the run of blocks comprises using arithmetic encoding, Huffman coding or universal coding.

16. The system of claim 11, wherein the file map includes file map entries associated with at least a second file maintained by the file system and wherein compressing the file index comprises compressing the file index based on a number of files referenced by the file map.

17. The system of claim 16, wherein the second file is assigned a second file index that is different from the file index assigned to the file.

18. The system of claim 17, wherein the file index uniquely identifies the file and the second file index uniquely identifies the second file.

19. The system of claim 11 wherein the operations further comprise:
receiving a request to access a particular block, wherein the particular block is associated with a particular logical block number;
accessing the data structure to identify a pointer corresponding to the N-th file map entry closest to the particular logical block number, wherein the logical block number corresponding to the N-th file map entry closest to the particular logical block number is less than the particular block number;
identifying the file map entry corresponding to the particular block based on the pointer corresponding to the N-th file map entry closest to the particular logical block number; and
decoding the file map entry corresponding to the particular block.

20. The system of claim 11 wherein the operations further comprise:
receiving a request to access a particular block, wherein the particular block is associated with a particular block number; and
identifying the file map entry corresponding to the particular block without decoding more than N file map entries.

21. A computer-readable medium storing instructions that upon execution by a processing device cause the processing device to perform operations, comprising:
accessing a file maintained by a file system that manages access to a block device, wherein the file includes a plurality of active blocks, wherein each of the plurality of active blocks is associated with a respective logical block number and a respective block index that represents a position of the block relative to other blocks in the file;
assigning a file index to the file;
analyzing the file to determine a maximum block index and a minimum block index included in the file;
identifying runs of blocks in the plurality of active blocks, wherein each run of blocks includes a respective start block, wherein some runs of blocks include multiple blocks that are adjacent to one another in the file, wherein the logical block numbers associated with the adjacent blocks increase by one;
for each of the runs of blocks, identifying a respective length of the run of blocks;
for each start block, generating a file map entry for each start block, wherein generating the file map entry comprises:
    compressing the file index;
    compressing the block index associated with the start block based on the maximum block index and minimum block index; and
    compressing the length of the run of blocks associated with the start block; and
storing the file map entries in a file map;
loading the file map, during an initialization process associated with the block device; and
for each N-th file map entry included in the file map:
    storing a pointer to the N-th file map entry in a data structure, wherein N is an integer greater than 1 and wherein the pointer to the N-th file map entry is stored at a location based on the logical block number associated with the N-th file map entry divided by N.

22. The computer-readable medium of claim 21, wherein the operations further comprise:
storing the file map entries in order based on the logical block numbers associated with the file map entries.

23. The computer-readable medium of claim 21, wherein at least one of the file map entries is a triplet having the format <compressed file index, compressed block index, compressed length of the run of blocks>.

24. The computer-readable medium of claim 21, wherein compressing the file index and block index comprises using variable length compression to compress the file index and the block index.

25. The computer-readable medium of claim 21, wherein compressing the length of the run of blocks comprises using arithmetic encoding, Huffman coding or universal coding.

26. The computer-readable medium of claim 21, wherein the file map includes file map entries associated with at least a second file maintained by the file system and wherein compressing the file index comprises compressing the file index based on a number of files referenced by the file map.

27. The computer-readable medium of claim 26 wherein the second file is assigned a second file index that is different from the file index assigned to the file.

28. The computer-readable medium of claim 27 wherein the file index uniquely identifies the file and the second file index uniquely identifies the second file.

29. The computer-readable medium of claim 21, wherein the operations further comprise:
- receiving a request to access a particular block, wherein the particular block is associated with a particular logical block number;
- accessing the data structure to identify a pointer corresponding to the N-th file map entry closest to the particular logical block number, wherein the logical block number corresponding to the N-th file map entry closest to the particular logical block number is less than the particular block number;
- identifying the file map entry corresponding to the particular block based on the pointer corresponding to the N-th file map entry closest to the particular logical block number; and
- decoding the file map entry corresponding to the particular block.

30. The computer-readable medium of claim 29 wherein the operations further comprise:
- receiving a request to access a particular block, wherein the particular block is associated with a particular block number; and
- identifying the file map entry corresponding to the particular block without decoding more than N file map entries.

* * * * *